O. T. SWEET.
OUTLET BOX WITH KNOCK-OUT SECTIONS.
APPLICATION FILED JUNE 28, 1916.
1,264,450.
Patented Apr. 30, 1918.
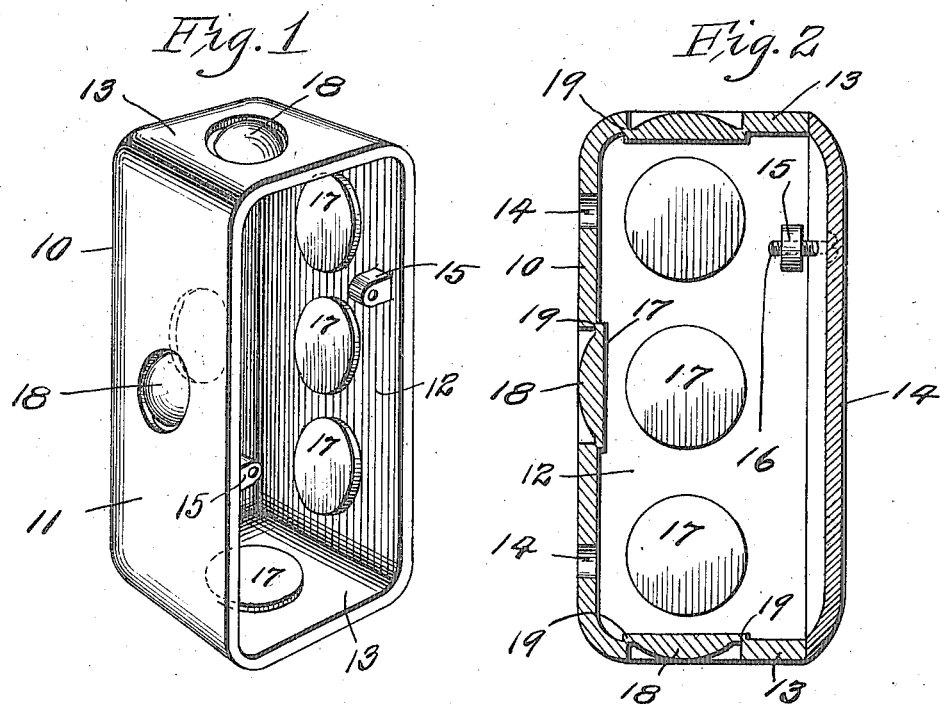
Inventor
Oliver T. Sweet

UNITED STATES PATENT OFFICE.

OLIVER T. SWEET, OF ST. LOUIS, MISSOURI.

OUTLET-BOX WITH KNOCK-OUT SECTIONS.

1,264,450.

Specification of Letters Patent.

Patented Apr. 30, 1918.

Application filed June 28, 1916. Serial No. 106,395.

*To all whom it may concern:*

Be it known that I, OLIVER T. SWEET, a citizen of the United States, residing at St. Louis, Missouri, have invented a certain new and useful Improvement in Outlet-Boxes with Knock-Out Sections, of which the following is a full, clear, and exact description, such as will enable others skilled in the art to which it appertains to make and use the same, reference being had to the accompanying drawings, forming part of this specification.

My invention relates generally to receptacles commonly employed in electric wiring systems for containing switches, fuses or other electrical devices, the embodiment of my invention herein illustrated and described being a type box adapted to be placed in the walls of buildings to receive the ends of conduits carrying electric wires, which latter are connected to switches or the like contained in said box.

In the construction of boxes or receptacles of the type to which my invention relates, it is essential that the walls of the box be provided with openings adapted to receive the ends of the conduits in which the electric wires are carried, and it has heretofore been the usual practice to provide said boxes with knock-out sections, that is, predetermined portions which are partially cut or separated from the walls of the boxes so that when the boxes are installed, said predetermined portions may be readily knocked out by being struck with a hammer or like tool.

It is the principal object of my invention to form a box or receptacle of cast metal and to form the knock-out sections integral with said walls, the metal between the edges of said knock-out sections and the walls of the box or receptacle being comparatively thin, thus permitting the knock-out sections to be easily and quickly removed at the time the box is installed.

By my improved construction, outlet or junction boxes and the like can be very easily and cheaply manufactured and by virtue of the cast construction there are no open joints or slits between the edges of the knock-out sections and the walls of the box, which latter construction permit dust and moisture to enter the box after it has been installed, with the result that the inclosed electrical devices are sometimes rendered inoperative due to the accumulation of dust or rust due to the presence of excessive moisture.

With the foregoing and other objects in view, my invention consists in certain novel features of construction and arrangement of parts, hereinafter more fully described, claimed and illustrated in the accompanying drawings, in which—

Figure 1 is a perspective view of a cast metal box of my improved construction, the cover thereof being removed.

Fig. 2 is a vertical section taken through the center of my improved box with the cover in position thereupon.

Referring by numerals to the accompanying drawings which illustrate a single box of the type adapted to receive a wall switch or fuse plug, 10 designates the bottom plate or wall, 11 and 12 the side walls, 13 the end walls, and 14 the cover plate.

The body of the box or that portion comprising the bottom, side and end walls is cast in a single piece with the corners between said walls preferably rounded as illustrated.

Formed through the bottom plate 10 are suitably located apertures 14 which are adapted to receive screws or like devices which are utilized in securely fastening the box to a wall member. Formed integral with the side walls 11 and 12 are inwardly projecting perforated lugs 15 which are adapted to receive the threaded ends of screws 16, the latter serving to secure the cover plate 14 firmly in closed position.

Formed integral with the bottom, side and end walls of the box are knock-out sections 17, the same being preferably round and slightly inset with respect to the walls with which they are formed. The outer faces 18 of these knock-out sections are preferably convex in order to form hammering surfaces and by such construction a recess is formed around each knock-out section, the outer portion of said recess being of such depth as to extend almost entirely through the wall of the box. The web of metal 19 between the edges of said sections and the adjacent portions of the walls is comparatively thin so that when the convex outer face of any one section is struck a sharp blow with a hammer or the like, said metal will give way or break easily, thus forming an aperture in the wall and which aperture is adapted to receive the end of a wire carrying conduit.

The inner or inset portion of each knock-out section is larger in diameter than the recess formed in the outer face of the wall of the box around said knock-out section, and by such construction, the plane of cleavage between the edge of the section and the wall of the box when said section is knocked out will be beveled or inclined with respect to the inner face of the wall of the box and with respect to the annular edge of the opening formed by the knocking-out operation. As a result of this provision, there will be no rough edges projecting into the opening when the knock-out section is removed, which rough edges would interfere with the ready insertion of the cable carrying conduit into said opening.

Boxes of my improved construction may be cast in any size and shape and can be effectively used wherever a strong and substantial dust and water proof box or container for electrical devices is required, and which devices are connected to wires which are led to the box or container through metal conduits.

It will be readily understood that minor changes in the size, form and construction of the various parts of my improved outlet box can be made and substituted for those herein shown and described, without departing from the spirit of my invention, the scope of which is set forth in the appended claims.

I claim:

1. A cast metal outlet box provided with an integrally formed knock-out section which is offset with respect to the wall of the box, thereby forming a recess in one face of the box wall, and a protuberance on the other face, said protuberance being larger in diameter than said recess.

2. A cast metal outlet box provided with an integrally formed knock-out section, the wall of material between the edge of said section and the wall of the box being substantially thinner than the knock-out section and the box wall, a portion of said knock-out section being offset with respect to the wall of the box, and said offset portion being larger in diameter than the opening which is formed when said section is removed.

3. A cast metal outlet box provided with an integrally formed knock-out section, there being a recess formed in the outer face of the wall of the box around said knock-out section, and a portion of said knock-out section being offset with respect to the wall of the box to form a protuberance which is larger in diameter than the diameter of the externally disposed recess.

4. A cast metal outlet box provided with an integrally formed knock-out section, there being a recess formed in the outer face of the wall of the box around said knock-out section, and a portion of said knock-out section being offset with respect to the wall of the box to form a protuberance which is larger in diameter than the diameter of the recess, and the edge of said protuberance lying parallel with the edge of the recess.

In testimony whereof I hereunto affix my signature in the presence of two witnesses, this 24th day of June, 1916.

OLIVER T. SWEET.

Witnesses:
M. P. SMITH,
M. A. HANDEL.

Copies of this patent may be obtained for five cents each, by addressing the "Commissioner of Patents, Washington, D. C."